(12) United States Patent
Mitchell et al.

(10) Patent No.: US 8,655,873 B2
(45) Date of Patent: Feb. 18, 2014

(54) SYSTEM AND METHOD FOR AGGREGATING AND DISTRIBUTING GEOTAGGED CONTENT

(75) Inventors: Scott Mitchell, Naples, FL (US); Philip B. Harris, Naples, FL (US)

(73) Assignee: Geofeedr, Inc., Naples, FL (US)

( * ) Notice: Subject to any disclaimer, the term of this patent is extended or adjusted under 35 U.S.C. 154(b) by 0 days.

(21) Appl. No.: 13/284,455

(22) Filed: Oct. 28, 2011

(65) Prior Publication Data

US 2013/0110631 A1 May 2, 2013

(51) Int. Cl.
*G06F 7/00* (2006.01)
*G06F 17/30* (2006.01)

(52) U.S. Cl.
USPC .......................................... 707/724; 709/217

(58) Field of Classification Search
None
See application file for complete search history.

(56) References Cited

U.S. PATENT DOCUMENTS

| | | | |
|---|---|---|---|
| 6,363,320 B1 | 3/2002 | Chou | 701/207 |
| 7,698,336 B2 * | 4/2010 | Nath | 707/737 |
| 8,103,741 B2 | 1/2012 | Frazier et al. | 709/217 |
| 8,341,223 B1 | 12/2012 | Patton et al. | 709/204 |
| 8,428,228 B1 | 4/2013 | Baxter, Jr. | 379/88.14 |
| 2002/0029226 A1 | 3/2002 | Li et al. | 707/104.1 |
| 2003/0088609 A1 | 5/2003 | Guedalia et al. | 709/107 |
| 2004/0203854 A1 | 10/2004 | Nowak | 455/456.1 |
| 2004/0225635 A1 | 11/2004 | Toyama et al. | 707/1 |
| 2005/0034074 A1 | 2/2005 | Munson et al. | 715/712 |
| 2006/0002317 A1 | 1/2006 | Punaganti Venkata | 370/310 |
| 2006/0200305 A1 | 9/2006 | Sheha et al. | 701/200 |
| 2007/0112729 A1 * | 5/2007 | Wiseman et al. | 707/3 |
| 2007/0143345 A1 * | 6/2007 | Jones et al. | 707/104.1 |
| 2007/0210937 A1 * | 9/2007 | Smith et al. | 340/995.1 |
| 2007/0276919 A1 | 11/2007 | Buchmann et al. | 709/217 |
| 2008/0092054 A1 | 4/2008 | Bhumkar et al. | 715/739 |
| 2008/0104019 A1 * | 5/2008 | Nath | 707/3 |
| 2008/0192934 A1 | 8/2008 | Nelger et al. | 380/258 |
| 2008/0250031 A1 | 10/2008 | Ting et al. | 707/100 |
| 2009/0005968 A1 | 1/2009 | Vengroff et al. | 701/202 |
| 2009/0132435 A1 * | 5/2009 | Titus et al. | 705/400 |
| 2009/0138497 A1 | 5/2009 | Zavoli et al. | 707/102 |
| 2009/0300528 A1 * | 12/2009 | Stambaugh | 715/764 |
| 2010/0076968 A1 * | 3/2010 | Boyns et al. | 707/732 |
| 2010/0145947 A1 * | 6/2010 | Kolman et al. | 707/736 |

(Continued)

FOREIGN PATENT DOCUMENTS

| | | |
|---|---|---|
| EP | 1 045 345 | 10/2000 |
| WO | WO 99/15995 | 4/1999 |
| WO | WO 2010049918 A1 * | 5/2010 |

OTHER PUBLICATIONS

Web-a-where: geotagging web content, Amitay et al., Proceedings of the 27th annual international ACM SIGIR conference on Research and development in information retrieval (SIGIR), pp. 273-280, 2004.*

(Continued)

*Primary Examiner* — Augustine K Obisesan
(74) *Attorney, Agent, or Firm* — Pillsbury Winthrop Shaw Pittman LLP (57) ABSTRACT

A system and method for aggregating and distributing geotagged content comprises a server, a database, and a user interface. A user accesses the user interface to identify a spatial area and request content from a plurality of content providers that is geotagged with a location within the identified spatial area. The user interface may be on a webpage.

16 Claims, 7 Drawing Sheets

(56) References Cited

U.S. PATENT DOCUMENTS

| | | | |
|---|---|---|---|
| 2010/0153386 A1* | 6/2010 | Tysowski | 707/736 |
| 2010/0153410 A1* | 6/2010 | Jin et al. | 707/758 |
| 2011/0007941 A1 | 1/2011 | Chen et al. | 382/103 |
| 2011/0010674 A1 | 1/2011 | Knize et al. | 715/849 |
| 2011/0078584 A1 | 3/2011 | Winterstein et al. | 715/751 |
| 2011/0113096 A1 | 5/2011 | Long et al. | 709/204 |
| 2011/0123066 A9 | 5/2011 | Chen et al. | 382/103 |
| 2011/0142347 A1 | 6/2011 | Chen et al. | 382/190 |
| 2011/0288917 A1 | 11/2011 | Wanek et al. | 705/14.5 |
| 2012/0047219 A1 | 2/2012 | Feng et al. | 709/207 |
| 2012/0078503 A1 | 3/2012 | Dzubay et al. | 701/410 |
| 2012/0084323 A1 | 4/2012 | Epshtein et al. | 707/776 |
| 2012/0150901 A1 | 6/2012 | Johnson et al. | 707/769 |
| 2012/0166367 A1 | 6/2012 | Murdock et al. | 706/12 |
| 2012/0221687 A1 | 8/2012 | Hunter et al. | 709/219 |
| 2012/0276848 A1 | 11/2012 | Krattiger et al. | 455/41.2 |
| 2012/0276918 A1 | 11/2012 | Krattiger et al. | 455/456.1 |
| 2013/0018957 A1 | 1/2013 | Parnaby et al. | 709/204 |
| 2013/0073388 A1 | 3/2013 | Heath | 705/14.53 |
| 2013/0159463 A1 | 6/2013 | Bentley et al. | 709/217 |

OTHER PUBLICATIONS

U.S. Appl. No. 13/619,888, mailed Mar. 1, 2013, 15 pages.
U.S. Appl. No. 13/708,466, mailed Apr. 17, 2012, 15 pages.
U.S. Appl. No. 13/708,516, mailed May 15, 2013, 11 pages.
U.S. Appl. No. 13/708,404, mailed May 24, 2013, 12 pages.
Chow et al., "Towards Location-Based Social Networking Services", *LBSN 2010 Proceedings of the 2nd ACM SIGSPATIAL International Workshop on Location Based Social Networks*, Nov. 2, 2010, pp. 31-38.
Bao, Jie, et al., "GeoFeed: A Location-Aware News Feed System", *IEEE Xplore® Digital Library*, Published in *2012 IEEE 28TH International Conference on Data Engineering*, Apr. 1-5, 2012, 14 pages.
Sarwat, Mohamed, et al., "Sindbad: A Location-Based Social Networking System", *SIGMOD '12*, Scottsdale, Arizona, May 20-24, 2012, 4 pages.
U.S. Appl. No. 13/708,516, mailed Jun. 7, 2013, 14 pages.
U.S. Appl. No. 13/619,888, mailed Jul. 9, 2013, 10 pages.
U.S. Appl. No. 13/788,760, mailed Jul. 26, 2013, 12 pages.
U.S. Appl. No. 13/788,843, mailed Aug. 5, 2013, 17 pages.
U.S. Appl. No. 13/788,909, mailed Aug. 12, 2013, 17 pages.
U.S. Appl. No. 13/843,949, mailed Aug. 29, 2013, 12 pages.

\* cited by examiner

SYSTEM AND METHOD FOR AGGREGATING AND DISTRIBUTING GEOTAGGED CONTENT

FIELD OF THE INVENTION

The present teachings relate generally to obtaining, managing and distributing electronic content and, more particularly, to obtaining, managing and distributing geotagged Internet content aggregated from one or more providers.

BACKGROUND OF THE INVENTION

There has been a growth in Internet content as users flock to numerous social networking sites (e.g., Classmates.com, delicious, Facebook, Flickr, Foursquare, Friendster, Google+, LinkedIn, Meetup.com, Myspace, TravBuddy.com, Twitter, Yelp, Inc., etc.). These sites provide platforms for users to engage with each other by uploading/creating content in the form of commentary, pictures, status updates, etc. Users' statuses, photos, comments and other content is stored by these providers and shared to other users on the platform.

There has also been a growth in the use of mobile devices (e.g., smart phones, tablets, laptops, etc.) that provide the ability to geotag content with a particular location. Geotagging is the process of adding geographical identification metadata. This metadata usually consists of latitude and longitude coordinates. Mobile devices may have a geolocator such as a GPS (global positioning system) to determine the location of the mobile device. Using the geolocator, a user may take a picture with the mobile device, for example, and the picture may be "geotagged" with the geolocation where the picture was taken. This way, the picture (or other content) may later be referenced by location since it is appended with location coordinates or other attributes that specify its location.

Many users utilize multiple social networking sites or other Internet platforms. As a result, user content is be spread among different sites with no cohesive way to share content. Further, user content is typically organized by user or topic, but not by geolocation. There is the need for a system and method to aggregate and organize content by geolocation. Therefore, it would be beneficial to have a superior system and method for aggregating and distributing geotagged content.

SUMMARY OF THE INVENTION

The needs set forth herein as well as further and other needs and advantages are addressed by the present embodiments, which illustrate solutions and advantages described below.

The system of the present embodiment for aggregating and distributing geotagged content includes, but is not limited to, a server having a network connection, a storage accessible by the server, a user interface comprising a representation of a geographic location, the user interface in electronic communication with a user computer and providing for identification of a spatial area relative to the representation of a geographic location, and a formatter for formatting a request for geotagged content. Information related to format preferences for at least one of a plurality of content providers is stored on said storage. The server requests geotagged content relevant to the identified spatial area from the plurality of content providers, at least one of the requests having been formatted by the formatter. The geotagged content received from the plurality of content providers in response to the requests is aggregated and distributed over a network to the user computer.

A list (e.g., geofeed) of content of the present embodiment includes, but is not limited to, a server having a network connection, a storage accessible by the server, a user interface comprising a representation of a geographic location, the user interface in electronic communication with a user computer and providing for identification of a spatial area relative to the representation of a geographic location, and a plurality of geotagged content obtained from a plurality of content providers, the plurality of geotagged content relevant to the identified spatial area. The plurality of geotagged content is aggregated from the plurality of content providers and distributed over a network to the user computer.

The method of the present embodiment includes the steps of, but is not limited to, providing a server having a network connection, providing a storage accessible by the server, providing a user interface accessible by a user computer, accepting input from the user computer over a network, the input comprising the identification of spatial area(s) through the user interface, formatting, on the server, a request for geotagged content, using the identified spatial area(s), into a format preferable for at least one of a plurality of content providers, requesting content relevant to the identified spatial area(s) from the plurality of content providers, aggregating the requested geotagged content on the server, and distributing the aggregated content to the user computer. The storage stores information on the format preferences for at least one of the plurality of content providers.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In one embodiment, the system comprises a server having one or more storages, which may comprise, for example, any type of electronic storage device and may be configured as one or more database(es). The system also comprises one or more interfaces and one or more formatters. User computers may communicate with the server over a network such as the Internet and utilize one of the one or more interfaces in order to request geotagged content relevant to a particular location. Geotagged content may be aggregated from a number of different information providers (hereinafter "providers") such as social networking sites, although not limited thereto. Aggregated geotagged content may be returned to the user computer through the interface, although not limited thereto.

One of the interfaces may comprise a graphical user interface (GUI) that allows a user (e.g., using the user computer) to identify a spatial area of interest by drawing boundaries on a map, although not limited thereto. For example, the boundaries may be free-form lines or pre-selected shapes such as rectangles or circles, although not limited thereto, that may overlay a map. The interface may comprise any representation of a geographical location and the present teachings are not limited to a map. For example, it may provide textual representations of geographic locations. What is desirable is to be able to identify a spatial area in relation to the representation of a geographical location in order to request geotagged content for that spatial area, although not limited thereto.

A formatter may format the user-identified spatial area into a format suitable for requesting geotagged content from at least one of a plurality of providers. Such providers may include social networking sites like Facebook and Twitter, although not limited thereto, which may store geotagged content from content creators (e.g., their users).

Geotagging can help users find a wide variety of location-specific information. For instance, one can find images taken near a given location. Geotagged information can also be used to find location-based news, websites, or other resources. Geotagged metadata usually includes latitude and longitude coordinates, though it may also include altitude, bearing, distance, accuracy data, and place names, although not limited thereto.

The system further provides for the generation of a "geofeed," or a collection of content relevant to a specified location. Geofeeds may be desirable in any number of situations. For example, a "New York City geofeed" may contain tweets, photos, and videos that are geotagged in Manhattan. A "Super Bowl geofeed" may contain photos and tweets within a 1 mile radius around the Super Bowl venue. And a "Marriott geofeed" may contain tweets that originate from any Marriott property. It is to be appreciated that these particular embodiments are exemplary in nature and the present teachings are not limited thereto. In fact, a geofeed may be created using any type or types of locations or any size area or areas.

The system still further facilitates showing all "tweets" that originate in a user's hometown. Or a user may wish to see photos and videos that were taken at Yankee Stadium. Or a user may wish to see tweets, photos, and videos that originate from a Presidential Debate. In another embodiment, a user may wish to see raw data for tweets, photos, and videos geotagged at LAX airport. This may indicate if there are delays or be indicative of some other occurrence. It is to be appreciated that the present teachings may be configured in any number of different configurations for any number of different uses and the present teachings are not limited to any particular embodiment disclosed herein.

Retrieving content relevant to a specified location may be performed by sending a search request to each content provider, aggregating the results from each of those providers, and formatting the aggregation into a single response for the user, although not limited thereto. First, a user may request content for a particular location. Next, the system may format requests to each content provider, asking for data within the requested location. Next, the system may aggregate the results and return it to the requestor in a particular format.

Figure 1:
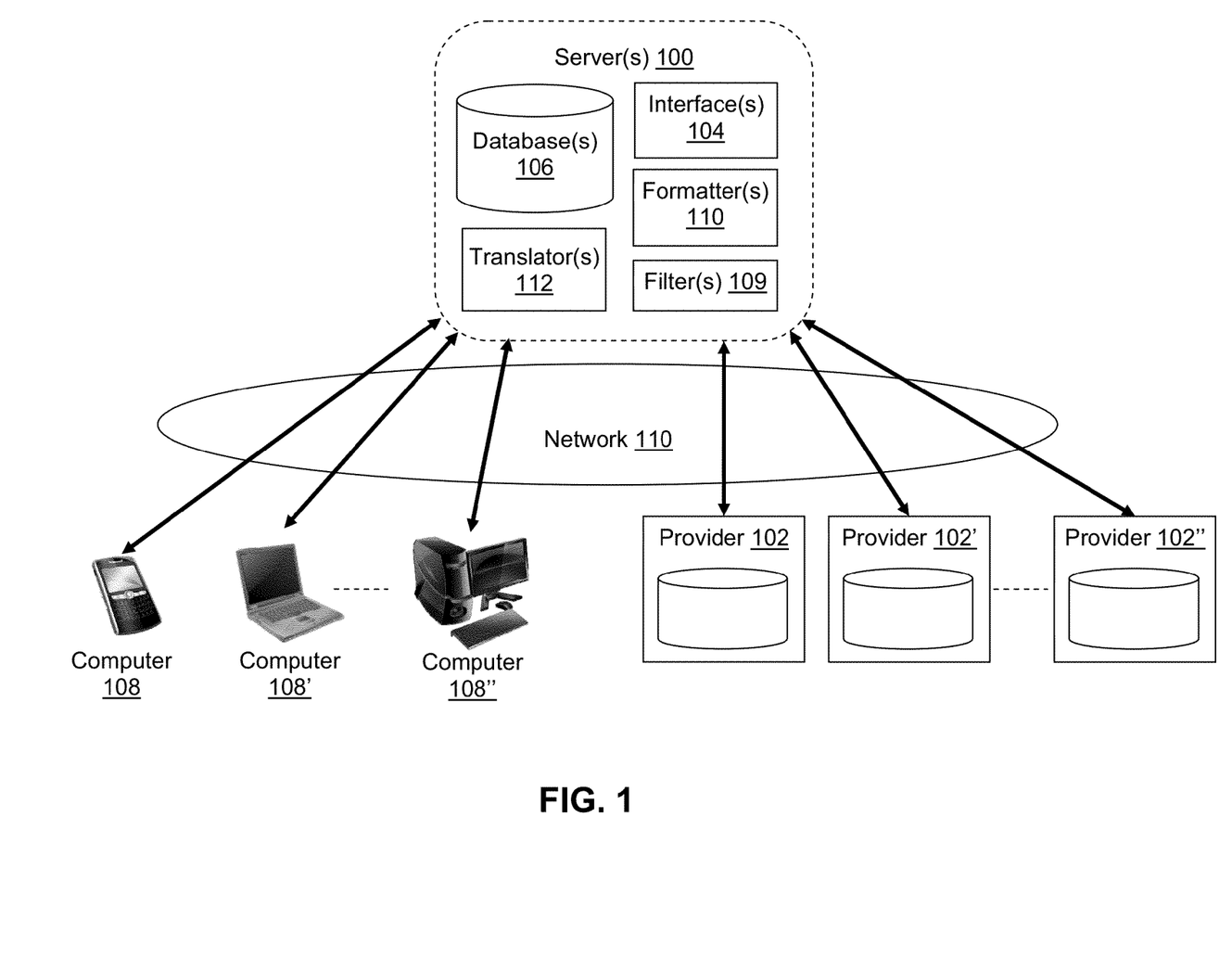
FIG. 1 is a schematic diagram of one embodiment of the system according to the present teachings.

Referring now to FIG. 1, shown is a schematic diagram of one embodiment of the system according to the present teachings. The system may query providers 102,102',102" of content, which may be digital Internet content, in order to obtain content that is geotagged with a location within a specific spatial region, although not limited thereto. The obtained content may then be aggregated for distribution or display, although not limited thereto. As shown, the system may comprise one or servers 100 in electronic communication with one or more computers 108,108',108" and one or more providers 102,102',102" over a network 110. In one embodiment, the network 110 is the Internet. The computers 108,108',108" may comprise any type of computing machine such as desktops, laptops, cell phones, tablets, and mobile devices, although not limited thereto. Users of the system may utilize such computers 108,108',108" to interact with the server and receive geotagged content. Communication between any components of the system may be performed wirelessly, although not limited thereto. For example, the computers 108,108',108" may communicate with the servers 100 over a cell phone or high speed wireless network. The system may obtain geotagged content from providers 102,102',102", which may be Internet service companies such as social networking websites, although not limited thereto.

The server 100 or servers may comprise one or more databases 106 (e.g., storages), one or more interfaces 104 and one or more formatters 110, which may be in electronic communication with each other. Such communication may be performed over a network such as the Internet, although not limited thereto. In one embodiment, server 100 comprises a plurality of computers in communication with each other over the network. In this way, each such computer may "serve" up specific content such as databases 106, interfaces 104 or formatters 110, although not limited thereto.

Figure 6:
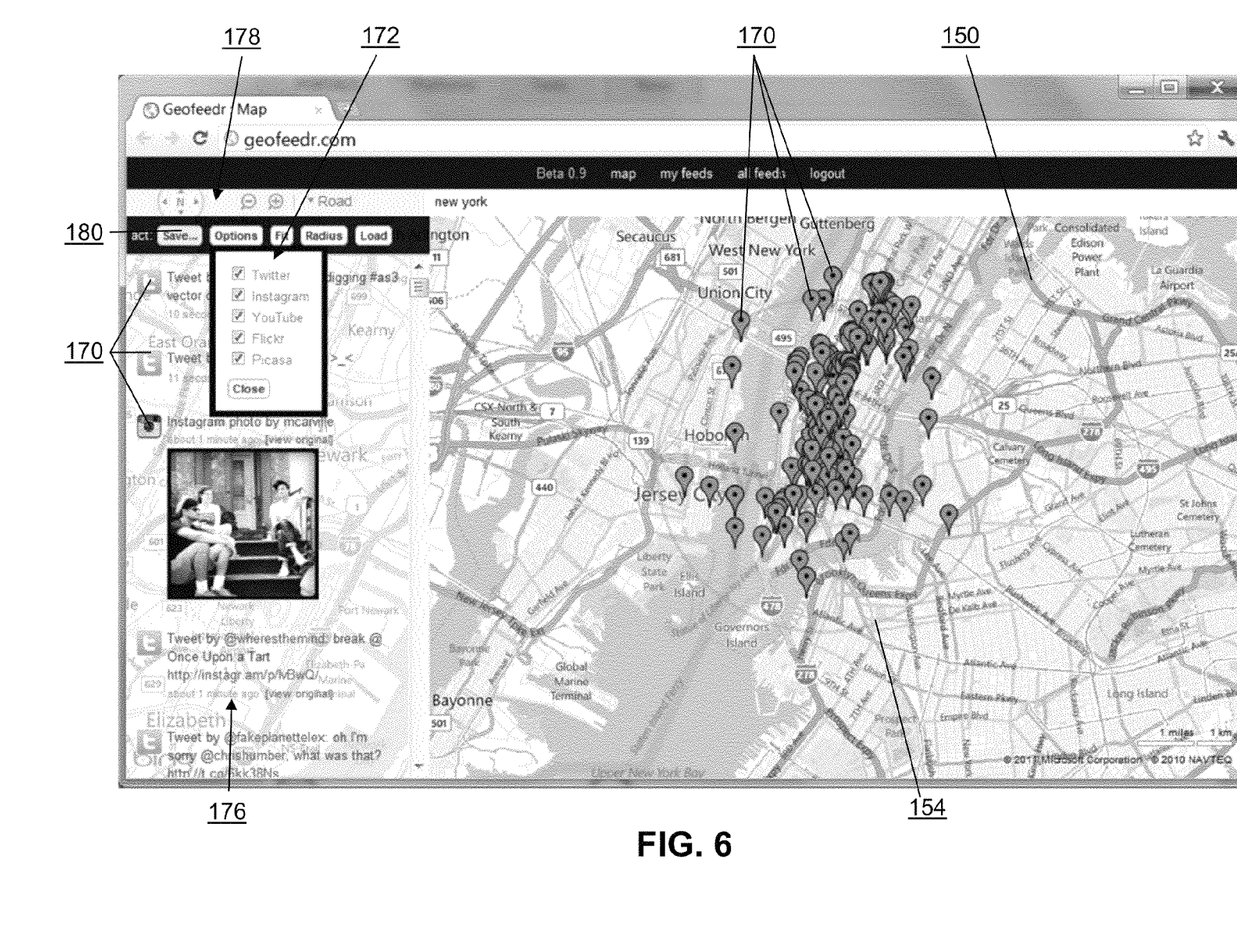
FIG. 6 is an embodiment of another user interface according to FIG. 1.

One of the one or more interfaces may be a user interface 104 that may provide access to the system for computers 108,108,108". For example, the user interface 104 may comprise a web page (as shown in FIG. 6) or a mobile application installed on a mobile device, although not limited thereto. It is to be appreciated that any number of interfaces 104 may be provided in order to provide access to the system by any number of different computers 108,108,108". Accessing the user interface 104 from a computer 108, a user may interact with the system in order to request geotagged content from providers 102,102',102". Interfaces may also be provided for providers or third parties (e.g., advertisers, etc.) to access the system, although not limited thereto, whether to provide content to the system or for some other purpose.

Providers 102, 102', 102" may accept a request for geotagged content using any number of different querying methods or data structures. Therefore, the server 100 or servers may employ one or more formatters 110 in order to format a request made through the user interface 104 into a format suitable for a particular provider 102. For example, a certain provider 102 may accept a request for geotagged content via a request to the provider's application programming interface (API) in xml format requiring particular xml fields. The system according to the present teachings may store the interface requirements for any number of different providers 102, 102', 102" so that a user's request for geotagged content can be formatted by the one or more formatters 110 for each such provider. In this way, the user need only make a single request to the system, which may then format the request as necessary for multiple providers 102, 102', 102".

The system may have one or more translators 112, although not limited thereto. In one example, a user may specify a location by the borders of the State of Florida. While one provider may reference geotagged content by state, another provider may require longitude and longitudes, although not limited thereto. Therefore, if a user simply specifies the State of Florida, the system will translate its borders into coordinates for querying the second provider. The system may store each provider's 102,102',102" requirements for searching for geotagged content, although not limited thereto. Such requirements may be stored in a database 106, although not limited thereto.

In certain situations, it may be preferable to obtain content from a provider that is not geotagged. In this situation, it may be possible to geotag the content through text or image recognition, although not limited thereto. For example, if content comprises a status update referring to the Empire State Building, that content may be geotagged with the location of the Empire State Building. In another example, if a photograph shows The White House as determined by a image recognition module, which may be implemented in either software or hardware or a combination thereof, the photo may be geotagged with the location of The White House. It is to be appreciated that any number of language or image processors may be applied to the content in order to relate it to one or more geographic locations and the present teachings are not limited to any particular embodiment disclosed herein. This recognition may be performed by one of the one or more translators 112, although not limited thereto.

A provider 102,102',102" may be any type of content provider. For example, a provider 102 may be a photo-sharing site (e.g., Flickr, Kodak Gallery, Photobucket, Picasa, Shutterfly, Snapfish, etc.) where a person can upload geotagged photos. In another example, a provider 102 may be a social networking site like Twitter or Facebook, which allows a person to supply comments or status updates geotagged with the geolocation of where the person is perceiving some event. In fact, any type of content may be obtained from any number of different providers 102, which may then be aggregated by the system, formatted and distributed to users, and the present teachings are not limited to any particular embodiment disclosed herein.

In one embodiment, geotagged content may be stored in a database 106 (e.g., storage) after it is obtained. This allows for ready retrieval without having to submit a subsequent request to a provider 102. In this way, the system according to the present teachings may become a repository of content that it acquires from other providers. In one embodiment, the system may provide an archive of geotagged and time-referenced content. For example, a user may wish to see a geofeed of Times Square during New Year's Eve 1999. In another embodiment, the system may obtain geotagged content on a real-time feed from providers 102, which it then may index in its database 106 according to geotag, although not limited thereto.

It is to be appreciated that content may also contain any number of other types of metadata beyond a geotag. For instance, the content may also include a title, comment, creator, date, content type, source, provider, description, etc. This metadata may provide an indication of geolocation. As an example, a photo may be titled "empire state building" or may be provided from a photo album titled "Red Sox game." Using metadata, it may be possible to index the content based on a geolocation derived from the metadata, although not limited thereto. This may be useful if the content is not already geotagged when it is acquired from a provider.

Figure 2:
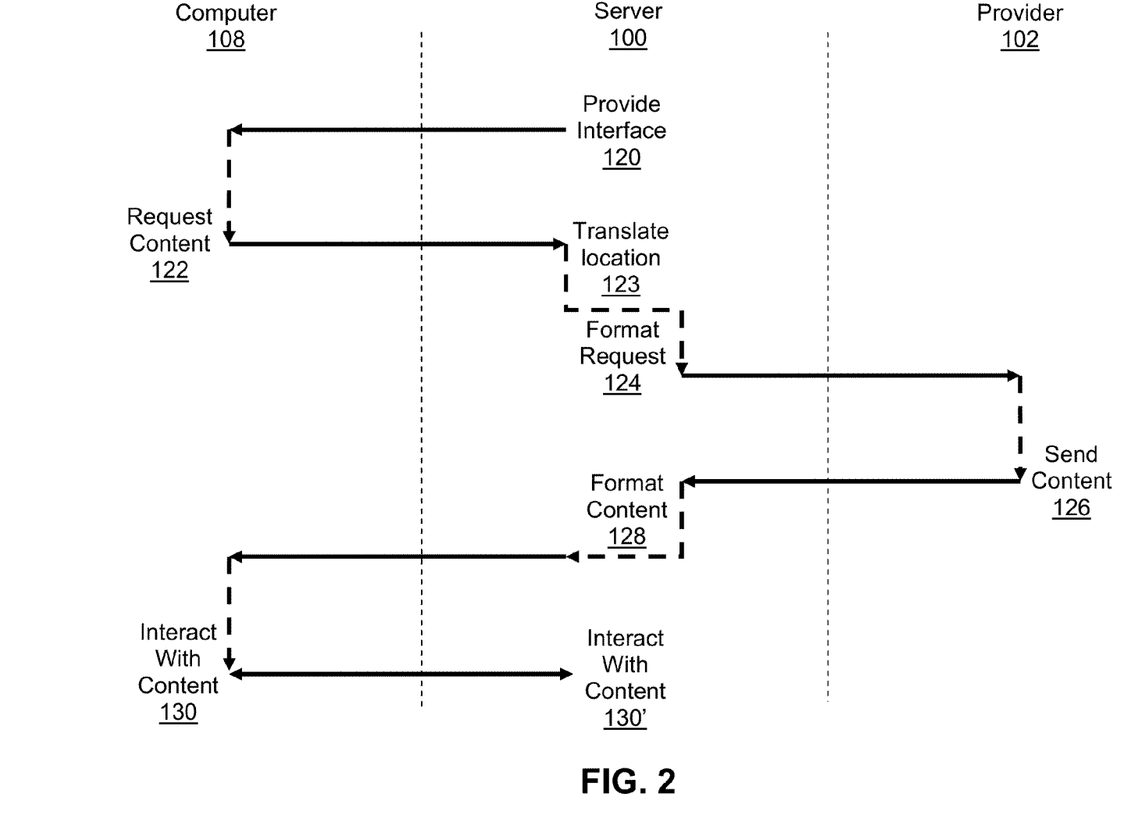
FIG. 2 is a schematic diagram depicting one embodiment of data transfer according to the system of FIG. 1.

Referring now to FIG. 2, shown is a schematic diagram depicting one embodiment of data transfer according to the system of FIG. 1. The server 100 may provide interface(s) 120 to the computer 108. This allows a user, using a mobile device, laptop, desktop, or any other computer 108, to interact with the system according to the present teachings. For example, the user may request geotagged content 122, which may include specifying the location for the geofeed, the providers to be searched, or any other filtering (e.g., using one or more filters 109 shown in FIG. 1), formatting or sorting preference, although not limited thereto. By providing preferences such as filtering and sorting of the content, a user can more easily customize the system.

The server 100 may obtain the geofeed request from the user and translate 123 it for each of the providers 102. It is to be appreciated that the user may be provided any number of different ways of identifying a location. In one embodiment, for example, this may include free-form drawing. The server may translate 123 the user's drawings to geographic points. In one embodiment, this involves calculating the latitudes and longitudes of the area identified by the user. Once the location is calculated (e.g., coordinates determined, etc.), a request may be formatted 124 into a suitable format(s) and sent to one or more providers 102.

It is to be appreciated that each provider may have different interfaces for requesting content. Providers may provide APIs (application programming interface) having specifications for routines, data structures, object classes, and protocols used to communicate with the provider. One skilled in the art would appreciate the differences in programmatic interfaces between providers' different systems. For example, one provider may require a single coordinate and radius to execute a search for geotagged content whereas another may require rectangular coordinates. The system according to the present teachings allows a user to specify a location in a single format that is then automatically formatted to any appropriate format for multiple providers.

Referring again to the Florida example, if a provider only permits requests by a point and radius, the system will translate/calculate 123 the most appropriate single coordinate and radius combination (e.g., point central to Florida and shortest radius that encompasses entire state, etc). The system may send the translated request to the provider and then filter the geotagged content it obtains so that it only returns to the user content geotagged with coordinates within Florida. This may be preferable if, for example, the calculated point and radius also includes additional locations outside of Florida (e.g., Cuba). It is to be appreciated that the server 100 may store information on each provider's interface so that any user request may be properly translated 123 and formatted 124 for any particular provider 102.

In one embodiment, a provider may provide a real-time stream of all content, although not limited thereto. In this case, the server 100 may categorize the content by geotag, store it, and return relevant content to a user when requested, although not limited thereto. In this way, the user may not have to wait for the system to query providers since the system already has content stored and readily available.

The system according to the present teachings may "burn" a feed (e.g., a geofeed of location-referenced content, etc.) by "crawling" the APIs of one or more providers to gather data and store it for future access, although not limited thereto.

This may be similar to how a web search engine indexes web content. In addition, it may assist users in managing geofeeds for particular location(s), providing additional management functionality and a simplified interface for accessing content from a number of providers.

The provider(s) 102 may send the requested content 126 to the server 100, which may then aggregate and format 128 it for output to a requesting user or users. Aggregated content may include content obtained from any number of different providers and/or content stored by the server 100, although not limited thereto.

It may be preferable in certain embodiments to provide a user with targeted advertising relevant to the requested content. Advertising content may be stored in the database 106 or delivered by a third party and inserted into a geofeed. Advertising content may be relevant to the type of content (e.g., photo printing services for photo content, etc.), the geofeed (e.g., local area restaurant advertisement for user-specified location, etc.), content description (e.g., automobile repair services for content referring to a car crash, etc.), or some other attribute. It is to be appreciated that the system may incorporate advertising to users in any number of different ways and the present teachings are not limited to any particular embodiment disclosed herein.

Once content is returned to the user computer 108, the user may interact 130, 130' with the content. This may include commenting on the content, tagging it, "liking" it, sharing it, or any number of different interactions. In one embodiment (as shown in FIG. 6), content may be referenced on a map by some graphic indicator. By clicking on the graphic indicator, a user may be able to access the content in more detail. For example, the content may be presented in a popup window or in a frame overlaying the map, although not limited thereto. In certain embodiments, the content may include additional information obtained from the provider, such as associated comments or metadata from the provider, although not limited thereto. Interactions may also include filtering, formatting and sorting the content in order to customize its organization, although not limited thereto.

In another embodiment, interaction 130, 130' may comprise posting geofeed content to a social network such as Twitter or Facebook, although not limited thereto. A user may interact 130, 130' in any number of different ways that would be appreciated by one skilled in the art desiring to aggregate and distribute geotagged content and the present teachings are not limited to any particular embodiment disclosed herein.

Figure 3:
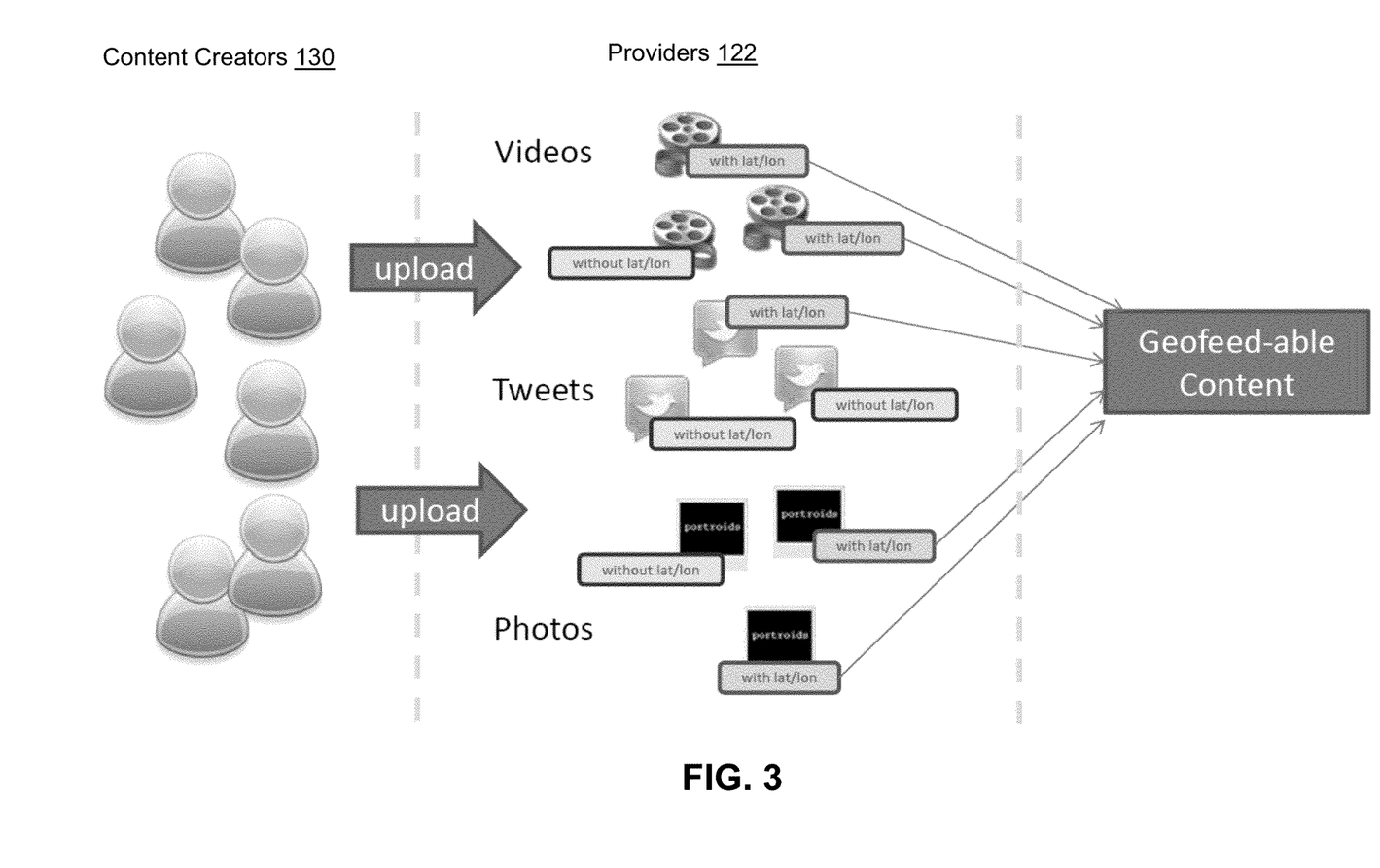
FIG. 3 is a schematic diagram depicting the uploading of geotagged content by content creators to providers such as social networking websites, which is then aggregated by the system according to FIG. 1.

Referring now to FIG. 3, shown is a schematic diagram depicting the uploading of geotagged content by content creators 130 to providers 122 such as social networking websites, which is then aggregated by the system according to FIG. 1. As shown, content creators 130 upload (e.g., post or otherwise provide, etc.) content to providers 122 such as twitter, flickr, picasa, instagram, youtube, etc.

When users create content, such as with a mobile device, although not limited thereto, the content may be geotagged with a latitude/longitude to specify the location where the content was created or some other location reference, etc. When the content is provided to the provider 122, the geotag metadata may also be provided. This way, when a user of the system according to the present teachings requests a geofeed for a particular location, any content provided to a provider 122 having a relevant geotag may be obtained by the system for aggregation and displayed as a geofeed.

Figure 4:
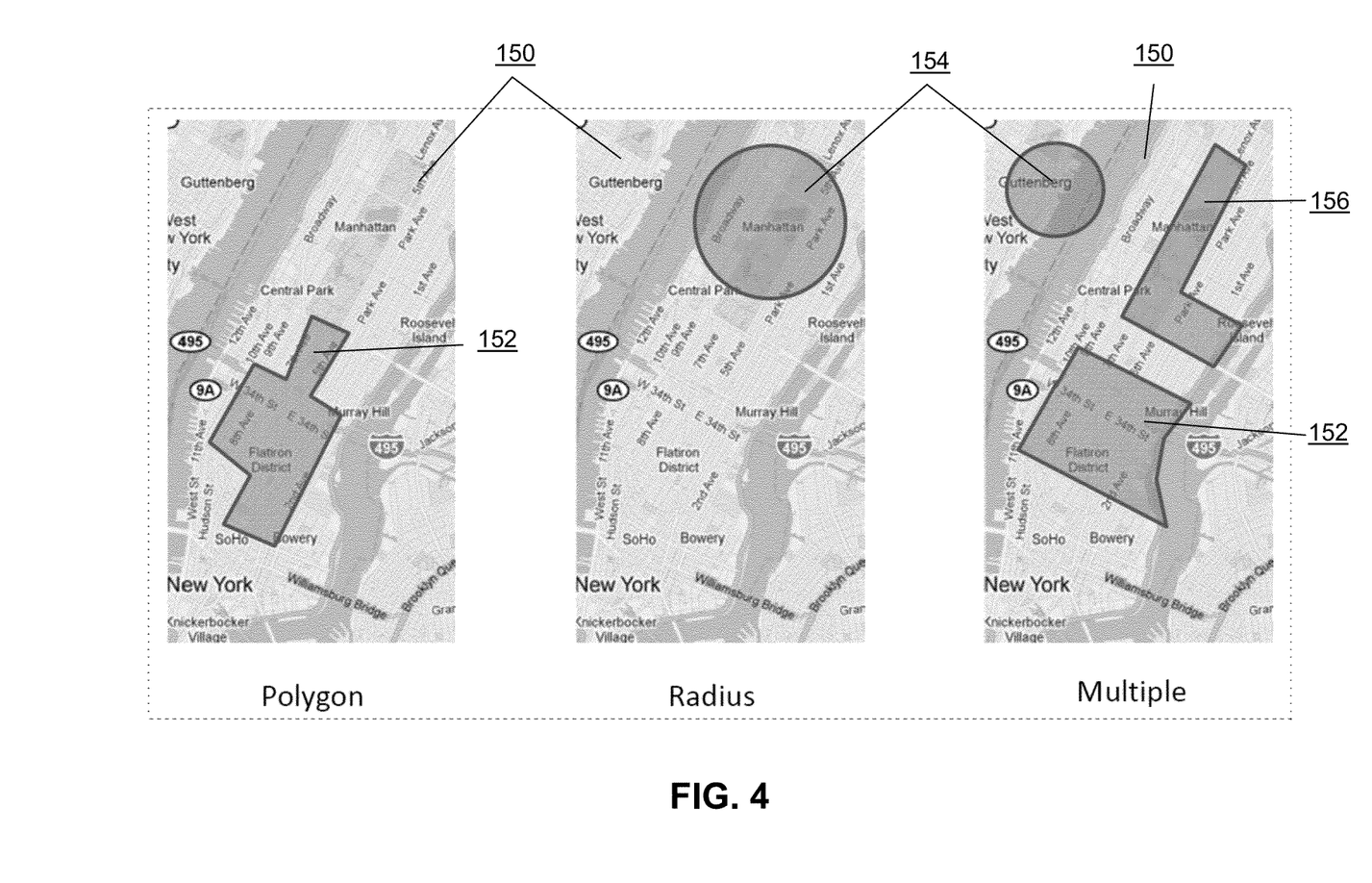
FIG. 4 are embodiments of a user interface according to FIG. 1.

Referring now to FIG. 4, shown are embodiments of a user interface according to FIG. 1. The system according to the present teachings may provide a number of different ways for a user to identify a spatial area and request a geofeed. For example, as shown, the system may provide the ability for a user to draw free-form boundaries 152, use predetermined shapes such as circles 154 or rectangles 156, or a combination thereof, although not limited thereto. In this way, it is possible for the user to define a spatial area or areas overlaid on a map 150. Once the spatial area(s) is/are defined, the user may request relevant content.

Defining a spatial area allows the user to create a geofeed for that spatial area. A spatial area can be any location, which may be defined in relation to a map (e.g., overlaid on map as shown, etc.), such as a polygon, a radius around a point, or a combination thereof, although not limited thereto. In one embodiment, the user interface provides a user the ability to draw any combination of curved and straight lines to identify a spatial area. For example, a user may use a computer mouse like a pencil to draw a shape in relation to a map and define a spatial area, although not limited thereto. In another embodiment, the user may utilize the geolocation of the user computer (e.g., mobile device) to define a spatial area. For example, although not limited thereto, a user may define the spatial area as within a 1 mile radius of the user computer, as determined by a GPS or other location device, and any distance may be used. In another embodiment, the user computer may determine that it is within a particular town or other geographic location and the user may define the spatial area as such. It may also be one or more predefined locations such as, for example, all movie theaters in New York. Predefined locations may be created by the system and by users, although not limited thereto. In this way, the system may store user preferences, which may include locations, spatial areas, geofeeds, etc., although not limited thereto. In one embodiment, an advertiser may sponsor a predefined location. For example, Starbucks may wish to provide a predetermined location of all Starbucks coffeehouses or all coffeehouses in Connecticut, although not limited thereto. In this way, a user of the system will be provided with a way to easily see what content is being created at these locations. A user interested in keeping tabs on a particular location may define a custom location and store it in the system so that when he/she returns to the system he/she periodically receive geofeed updates.

In one embodiment, the user may provide coordinates, an address, or some other geographically-descriptive information in order to define a spatial area, although not limited thereto.

It is to be appreciated that a user may create an account on the system in order to save preferences or a history of geofeeds, although not limited thereto. In this way, a user may also share or restrict access to geofeeds or other content to other users in the system. This may include the use of permissions that allow certain users to see certain content and restrict others, although not limited thereto.

Figure 5:
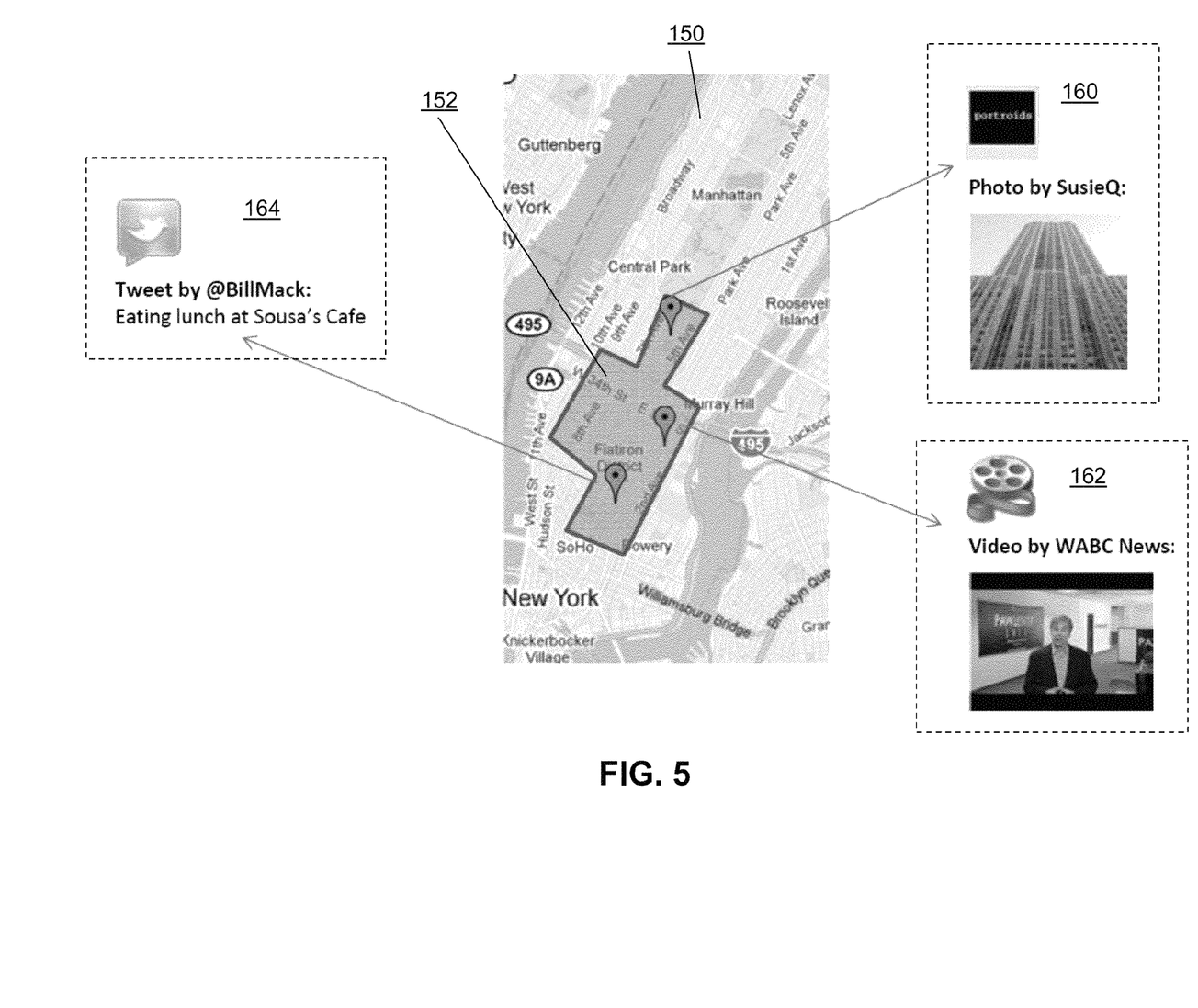
FIG. 5 is an embodiment of a user interface according to FIG. 1 depicting a variety of content in a geofeed.

Referring now to FIG. 5, shown is an embodiment of a user interface according to FIG. 1 depicting a variety of content in a geofeed. As describe in relation to FIG. 4, a user may draw boundaries 152 on a map 150 in order to create a geofeed. When requested, the geofeed will collect digital content that is geotagged with a location within the identified spatial area. Content may include photos 160 (which may be geotagged) uploaded to an Internet sharing site, video 162 (which may be geotagged) provided by a local news station, or a tweet 164 (which may be geotagged), although not limited thereto. So designed, the system according to the present teachings may allow a single interface for querying multiple providers for content geotagged with a location in an identified spatial area.

In one embodiment, professional content providers may provide content to the system that is geotagged with one or more locations. For example, a news story may reference multiple locations and be pertinent to multiple geofeeds. Local news organizations may wish to provide content that has embedded advertisements, although not limited thereto. The system may provide targeted distribution to content consumers.

In cases where the provider does not offer a search API that allows querying within spatial areas in the same format provided to a user of the system, the system may translate the spatial area specified by the user so that it can be recognized by the provider, and may then refine the provider's results to ensure that the response to the user only includes content geotagged in the requested spatial area. For example, in the Florida example, when a provider only allows a point and radius search, the system may create a radius that encompasses Florida and request content within that radius from the provider. The system may then further filter the results to include only those that exist in the Florida boundary before sending the response to the user.

The system may be capable of distributing content in multiple formats and even allow the user to specify the desired format, whether through a graphical user interface or otherwise (e.g., XML, json, GeoRSS, etc.). The system may also allow the user to specify the level of detail to include in the results. For example, raw data retrieved from the provider may include coordinate location, multimedia details, metadata, etc. Raw data that the system returns as a response to a user's geofeed request may include XML with attributes for title, date, creator, URL, description, source, ID, and geotag, although not limited thereto.

The system may request content from providers asynchronously, meaning that multiple providers may be queried simultaneously to maximize performance, although not limited thereto. Each provider query may have a "timeout" duration threshold, although not limited thereto. In this case, if a query to a provider exceeds the timeout threshold, the query may be aborted and the system may proceed as if no results were received from that provider. This way, the system may support any number of different providers.

The system may also allow the user to specify whether or not to group items in the response, although not limited thereto. The system may group items by the content's creator, location, or some other attribute. Through a user interface, the user may expand on the grouped items in order to obtain more detailed information.

The system may also expand on the content. For example, it may extract links from the content and evaluate whether or not each link is to multimedia (e.g., if it is a picture or video, etc.). If it is, the system may pull the media, store it alongside the data, and present as part of the aggregated/distributed content. In another embodiment, the system may extrapolate from the content and provide additional information. For example, if content includes a reference to city, it may offer a link to the city's tourism bureau or a travel agent. In another embodiment, if content has a reference to a particular business, it may offer a coupon or other offer from that business. It is to be appreciated that these are exemplary embodiments and the present teachings are not limited thereto.

The system may allow the user to specify filter criteria, although not limited thereto. In one example, a user may wish to filter content with titles that start with the "@" symbol. In another example, a user may wish to filter by provider, content author, date/time, or some other attribute. A user-definable filter using any content attribute may be used. In some cases, although not limited thereto, a user may wish to filter out spam or ads. For example, car ads found in Youtube videos, although not limited thereto. It is to be appreciated that content may be sorted and/or filtered on any attribute of the content and the present teachings are not limited to any particular embodiment disclosed herein.

The content returned from a provider may also include comments and/or additional information (e.g., metadata, etc.) that relates to the content. For example, it may be preferable for the system to obtain from a provider any comments made by users of a social networking site in relation to the content. In one example, a photo may be obtained from a provider along with any comments made in relation to the photo through the provider's system.

Referring now to FIG. 6, shown is an embodiment of another user interface according to FIG. 1. This embodiment comprises a radius geofeed with a circle 154 overlaid on a map 150. The circle 154 sets the boundary of the geofeed and inside are graphical depictions of various pieces of location-relevant content 170. A window 176 (e.g., frame, etc.) may show the content 170 in detail and provide scrollable geofeed of content, although not limited thereto.

Shown in this exemplary embodiment is a radius around the lower Manhattan area in New York City and the content 170 was retrieved as a result of requesting the geofeed. The content 170 is depicted by markers on the map 150 and in more detail in the window 176 on the left. Filters 172 are also shown, for example, the user may filter on particular providers (e.g., Twitter, Instagram, YouTube, Flickr, and Picasa). Filters 172 may provide any number of different ways to limit the content 170. For example, filters 172 may filter on content title, size, date/time, creator, provider, type of content, etc. It is to be appreciated that users of the system may be provided with the ability to filter content 170 on any piece of data or metadata and the present teachings are not limited to any particular embodiment disclosed herein.

Content 170 may also be sorted by any attribute, so that the user may organize the content 170 to the user's particular preferences, although not limited thereto. In this way, higher priority (as determined by sorting, etc.) content may be shown with larger graphical markers on the map 150, although not limited thereto. In the window 176, the content may be sorted in a list, although not limited thereto.

Any number of map navigation controls 178 may be provided, although not limited thereto. This may include the ability to pan in all directions, zoom in/out, navigate to predetermined favorite locations, and change view (e.g., satellite, street map, topographical map, street-level photos, etc.), although not limited thereto. One skilled in the art would appreciate the various navigation controls 178 that may be provided and the present teachings are not limited to any particular embodiment disclosed herein.

In one embodiment, the system may provide a real-time stream, where connected users are pushed new content. This way, the system may provide a passive interaction experience, although not limited thereto, where the user may set up the criteria for a geofeed and then monitor real-time updates (e.g., new content, etc.) for that geofeed.

In one embodiment, users may comment or otherwise interact with content 170. For example, a user may "like" a particular piece of content, recommend it to a friend, or otherwise assign it some user-defined prioritization, although not limited thereto. It is to be appreciated that the present teachings may incorporate many features of known social networking sites and apply them to the geofeed content in a novel way. For example, although not limited thereto, a user may be able to add a comment to a piece of content 172 from within the present system and it may then be communicated back to the provider and associated with the content in the provider's system. It is to be appreciated that data transfer of content may go back and forth between the system according to the present teachings and each provider. In this way, the system may provide a front-end for interacting with multiple providers, although not limited thereto. The system may also provide the ability to organize contacts in groups of friends, family, etc., and further provide the ability for users to share (and restrict) content with each other, although not limited thereto.

The system may provide a save button 180 in order to export or save a geofeed, although not limited thereto. This may include exporting the map 150, bounded area (e.g., defined by circle 154), content 172, and any other information such as interactions by the user (e.g., comments, etc.) into a preferable format for storage or sharing, although not limited thereto. A preferable format may include a report that encapsulates all of the downloaded data for easy reference. In one embodiment, the saved geofeed may be a complete representation of the webpage interface, along with the geofeed content, although not limited thereto.

Figure 7:
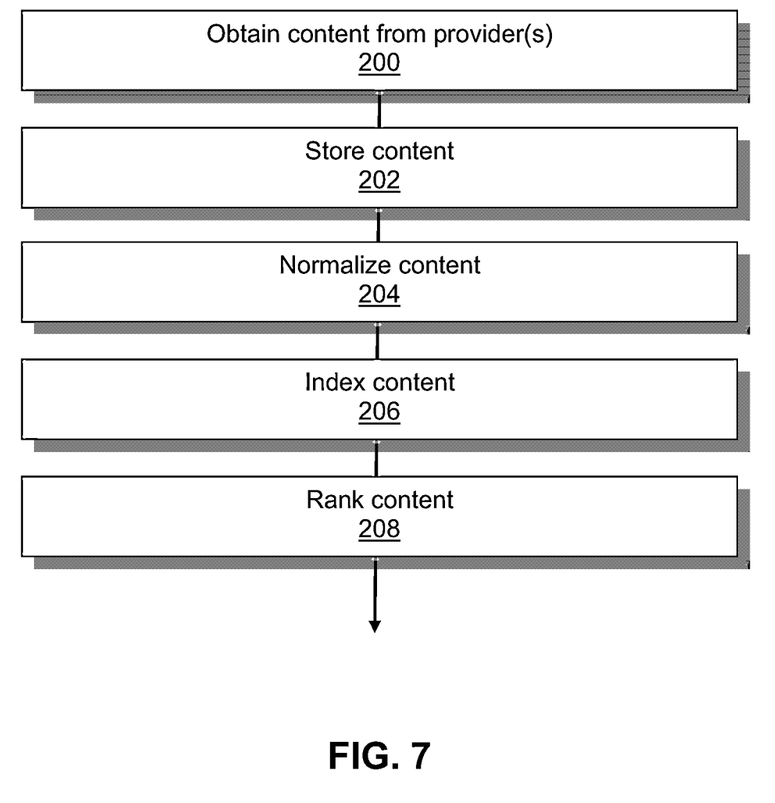
FIG. 7 is flowchart depicting one embodiment of content aggregation according to FIG. 1.

Referring now to FIG. 7, shown is flowchart depicting one embodiment of content aggregation according to FIG. 1. As discussed in relation to FIG. 1, content from one or more providers may be obtained and aggregated by the system. These providers may be social networking sites such as Badoo, Blogster, Buzznet, Classmates.com, delicious, Facebook, Flixster, Flickr, Fotolog, Foursquare, Friendster, Google+, Google Buzz, LinkedIn, Myspace, Tumblr, Twitter, and Yelp, Inc., although not limited thereto. In fact, any content database accessible on a network may be a content provider in accordance with the present teachings by providing access to stored content.

With reference to FIG. 7, the system may obtain content from one or more providers 200. Providers may enable a search API designed to allow a query for specific content. This may include finding content with specific keywords, from a particular content creator, or content geotagged with a particular geolocation. In addition, providers may enable a streaming API for real-time content streaming. This may allow for large quantities of search criteria to be specified and tracked, such as retrieving geo-tagged content from a certain geographic region. One skilled in the art would appreciate that there are a number of ways to obtain content from content providers 102 (shown in FIG. 1) and the present teachings are not limited to any particular embodiment disclosed herein. The content may be stored 202, such as in one or more storages (e.g., database(s) 106 shown in FIG. 1).

Content from multiple providers may be normalized 204 to a standard content format, although not limited thereto. To generate a single, homogenous collection of content items for a response to a user query (e.g., geofeed), the system may map elements from provider content to elements that appear in the system's response format. For example, the "title" of each content item returned to the user may contain a specific value from each provider. From Twitter, it may be the tweet text, while from Flickr it may be the photo's title and from Instagram it may be the photo's caption, although not limited thereto. Accordingly, the system may map its standard elements to those of each provider, although not limited thereto, in order to format content obtained from providers before returning it to a user. Formatting preferences/mapping may be stored in the database 106 (shown in FIG. 1), although not limited thereto. The system may also identify the source (e.g., provider, etc.) of the content when sending it back to the user, although not limited thereto. This allows the user to sort and/or filter the content by content provider.

Content may be indexed 206, although not limited thereto. Indexing may be by geolocation, descriptor, or some other content attribute, although not limited thereto. However, it is intended in one embodiment that the content be indexed by geolocation to permit querying for a particular geofeed, although not limited thereto. In this way, content may be stored by the system and readily available to users upon request, without introducing delays caused by provider query response times.

Content may also be ranked 208, although not limited thereto. Content rankings may be stored in a database 106 (shown in FIG. 1), although not limited thereto. The system may store content such that certain content and/or content creators (e.g., users that provide content to a content provider, etc.) are given higher ranking than others. The system may order (e.g., rank) content by displaying the highest ranked content first in response to a geofeed query.

In one embodiment, the system may determine ranking using an algorithm that determines the popularity of the content or creator, although not limited thereto. This popularity may be determined in relation to the determined popularity of other content, although not limited thereto. The system may track, for example, "likes", feedback (e.g., comments, etc.), or clicks the content receives, either within the system or from the provider system. The system may also track the popularity of the content creator on the system or provider system, based on the number of friends or associations, or likes or feedback for other content associated with the creator.

In this way, the system may determine the most popular and relevant content. It is to be appreciated that these are exemplary embodiments and the present teachings are not limited to any particular embodiment disclosed herein. For example, the content may also be ranked using proximity to the user's current location (or center of defined spatial area for a requested geofeed, etc.), how recent the content was created, or some user preferences (e.g., preferred content type, provider, creator, etc.). The system may determine rankings in real-time and modify rankings of content and content creators in a hierarchy on a continual basis.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for aggregating and distributing geotagged geofeed of content, comprising:
 a server having a network connection; and
 a storage accessible by the server, wherein the server is programmed by computer program instructions to:
  provide a user interface comprising a representation of a geographic location, the user interface in electronic communication with a user computer and configured to receive an identification of a spatial area relative to the representation of a geographic location;
  translate data relating to the identified spatial area into geographically-identifying information suitable for requesting content from at least one of the plurality of content providers;
  obtain a plurality of geotagged content from a plurality of content providers, the plurality of geotagged content relevant to the identified spatial area and based on the translated data;

obtain at least first content that is not already geotagged when received from one or more of the plurality of content providers; and automatically identify a location at which the first content was created based on: (i) metadata associated with the first content, or (ii) image recognition on the first content;

wherein the plurality of geotagged content is aggregated from the plurality of content providers, filtered by a filter, and archived at the storage based on a time that the plurality of geotagged content was individually created, and wherein the archived geotagged content is to be distributed over a network to the user computer.

2. The system of claim 1 wherein the plurality of geotagged content comprises photos and texts uploaded to the plurality of content providers by users of social networking sites.

3. The system of claim 1 wherein the user interface comprises a webpage.

4. The system of claim 1 wherein the user interface comprises an interface for an application of a mobile device.

5. The system of claim 1 wherein the plurality of geotagged content is sorted by a content ranking determined by the system.

6. The system of claim 1,
wherein the location at which the first content was created is identified based on metadata associated with the first content.

7. The system of claim 1, the server is further programmed to:
wherein the location at which the first content was created is identified based on image recognition of the first content.

8. The system of claim 1, the server is further programmed to:
annotate a first geotagged content that was obtained from a first content provider; and
upload the annotated first geotagged content back to the first content provider.

9. A method of aggregating and distributing geotagged geofeed of content, the method being implemented on a computer having one or more processors programmed with computer program instructions, the method comprising:
providing, by the one or more processors programmed with computer program instructions, a user interface comprising a representation of a geographic location, the user interface in electronic communication with a user computer and configured to receive an identification of a spatial area relative to the representation of a geographic location;

translating, by the one or more processors, data relating to the identified spatial area into geographically-identifying information suitable for requesting content from at least one of the plurality of content providers;

obtaining, by the one or more processors, a plurality of geotagged content from a plurality of content providers, the plurality of geotagged content relevant to the identified spatial area and based on the translated data;

obtaining, by the one or more processors, at least first content that is not already geotagged when received from one or more of the plurality of content providers; and automatically identifying, by the one or more processors, a location at which the first content was created based on: (i) metadata associated with the first content, or (ii) image recognition on the first content;

wherein the plurality of geotagged content is aggregated from the plurality of content providers, filtered by a filter, and archived at the storage based on a time that the plurality of geotagged content was individually created, and wherein the archived geotagged content is to be distributed over a network to the user computer.

10. The method of claim 9, wherein the plurality of geotagged content comprises photos and texts uploaded to the plurality of content providers by users of social networking sites.

11. The method of claim 9, wherein the user interface comprises a webpage.

12. The method of claim 9, wherein the user interface comprises an interface for an application of a mobile device.

13. The method of claim 9, wherein the plurality of geotagged content is sorted by a content ranking determined by the system.

14. The method of claim 9, wherein the location at which the first content was created is identified based on metadata associated with the first content.

15. The method of claim 9, wherein the location at which the first content was created is identified based on image recognition of the first content.

16. The method of claim 9, wherein the method further comprises:
annotating, by the one or more processors, a first geotagged content that was obtained from a first content provider; and
uploading, by the one or more processors, the annotated first geotagged content back to the first content provider.

* * * * *